June 27, 1967 J. DAVIDSE 3,328,517
CIRCUIT ARRANGEMENT FOR USE IN A COLOUR
TELEVISION RECEIVER FOR PRODUCING
THREE COLOUR SIGNALS
Filed Jan. 21, 1965 2 Sheets-Sheet 1

INVENTOR.
JAN DAVIDSE
BY
[signature]
AGENT

June 27, 1967 J. DAVIDSE 3,328,517

CIRCUIT ARRANGEMENT FOR USE IN A COLOUR TELEVISION RECEIVER FOR PRODUCING THREE COLOUR SIGNALS

Filed Jan. 21, 1965 2 Sheets-Sheet 2

INVENTOR.
JAN DAVIDSE
BY
Frank R. Trifari
AGENT

United States Patent Office 3,328,517

Patented June 27, 1967

3,328,517
CIRCUIT ARRANGEMENT FOR USE IN A COLOUR TELEVISION RECEIVER FOR PRODUCING THREE COLOUR SIGNALS

Jan Davidse, Rotterdam, Netherlands, assignor to North American Philips Company, Inc., New York, N.Y., a corporation of Delaware Filed Jan. 21, 1965, Ser. No. 426,892
Claims priority, application Netherlands, Jan. 24, 1964, 6,400,526
5 Claims. (Cl. 178—5.4)

Figure 1:
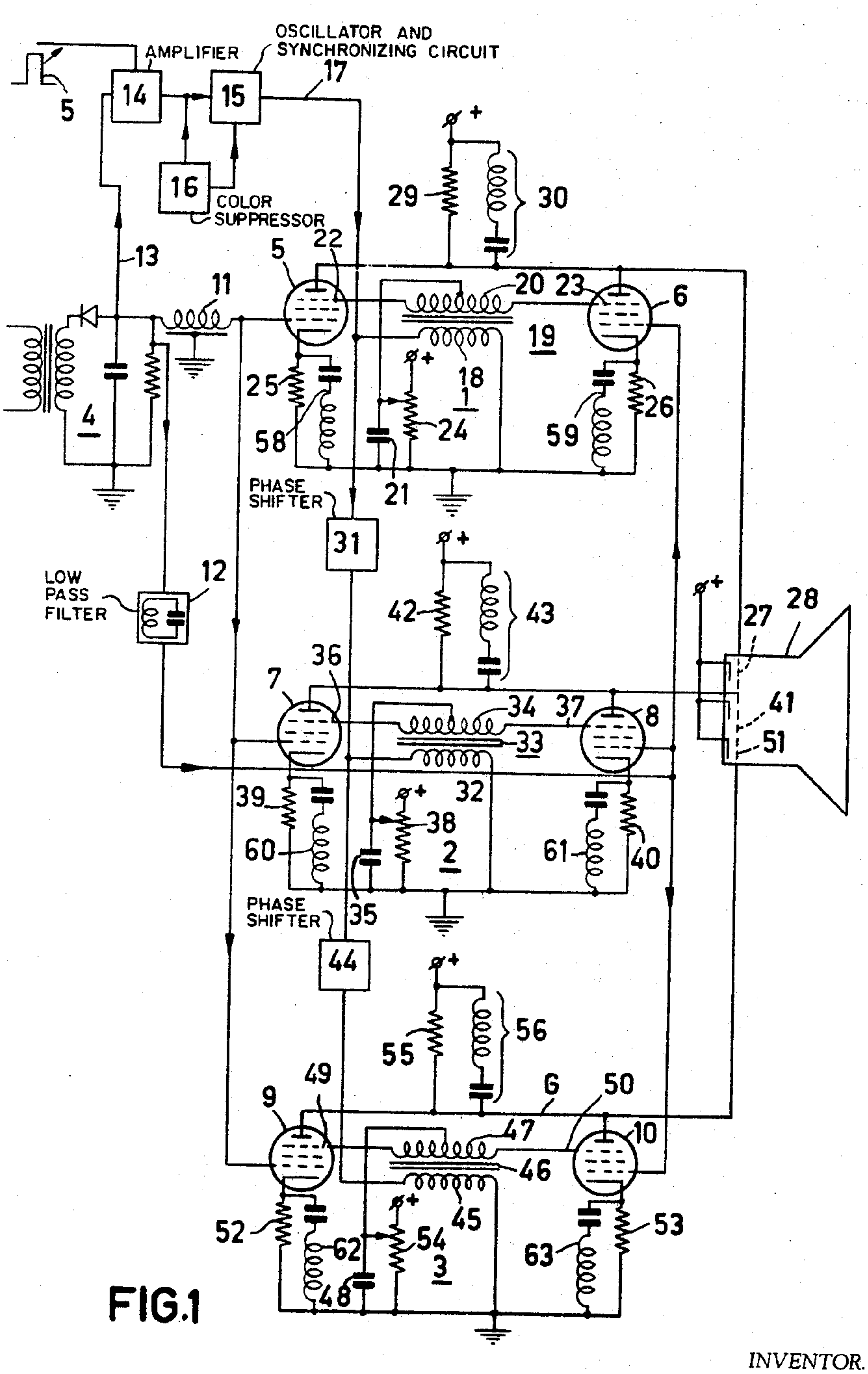

The invention relates to a circuit arrangement for use in a colour television receiver for producing three colour signals, i.e. the red (R), the blue (B) and the green (G) colour signal. The arrangement comprises a local oscillator for producing a subcarrier signal which is synchronized by means of an incoming burst signal, and at least three stages. The total, once detected incoming colour television signal consisting of a brightness component Y and two colour components modulated in quadrature on the subcarrier signal, is applied to each of the stages.

Such an arrangement is known from United States Patent 2,744,155. The arrangement described in this patent, which serves for the direct demodulation of the colour components, is very attractive, since there is no need for a separate brightness channel and a separate colour channel, which would increase the already fairly high price of a colour television receiver.

In receivers having a separate brightness channel and a separate colour channel, the former includes a low bandpass filter for removing all colour components from the signal, and a delay circuit having a comparatively high delay time.

The separate colour channel of such receivers includes a bandpass filter passing solely the colour components of the once detected signal to the synchronous demodulators, in which these colour components can be demodulated in synchronism. All these filter are required, since otherwise unwanted mixing products between the brightness components and subcarrier components or colour components, the frequencies of which are, it is true, odd-numbered multiples of half the line frequency, but which may produce a moiré-like pattern on the screen(s) of the display tube(s), to the guns of which the three colour signals obtained from the synchronous demodulators and the brightness signal have finally to be applied. This has a very disturbing effect.

A great disadvantage of the system having separate channels is not only the higher costs, but also in that the delay circuit must have a very long delay time, since the delay time of the comparatively narrow band filter in the colour channel has a very long delay and the delay circuit in the brightness channel must, of course, have the same delay time as this bandpass filter. Such a delay circuit having a long delay time can be constructed only with difficulty and is, moreover, critical.

While the demodulation circuit of the above patent eliminates the need for a critical delay line with a long delay period, it does not overcome the disadvantage of the moiré-like pattern.

An object of the invention is to provide a circuit arrangement for use in a colour television receiver of the kind set forth, which does not include separate brightness channels and colour channels and in which no special delay circuit having a long delay time and being constructed only with difficulty is required, while in spite thereof the moiré-like pattern does not appear.

The circuit arrangement according to the invention is characterized in that each stage is formed by a push-pull stage consisting of two demodulators, to one of which is applied, through a delay circuit of comparatively short delay time, the once detected colour television signal and to which is also applied a subcarrier signal obtained from the local oscillator for synchronous demodulation of the colour components. To the other demodulator of the push-pull stage is applied the once detected colour television signal through a low bandpass filter, the delay time of which is equal to that of the delay circuit and which passes solely the brightness component, and the subcarrier signal obtained from the local oscillator. Either the once detected colour television signal or the subcarrier signal is applied in phase opposition to the other demodulator with respect to both signals applied to the first-mentioned demodulator. The output circuits of the push-pull stages include filters for suppressing the subcarrier components.

It should be noted that a single push-pull stage, a plurality of which is employed in the receiver according to the invention, is known per se from French patent specification 1,313,438 (PH 16,847). This push-pull stage serves, however, for converting the incoming colour television signal into a dot sequential signal which is applied to the single gun of a one-gun display tube, but it does not serve for the demodulation of the colour components, so that the three colour signals are produced, which can be applied to the red, blue and green guns respectively.

With one-gun tubes, the moiré effect (appearance of a moiré-like pattern on the screen of the display tube) is of no consequence, since the synchronous demodulation is performed in the one-gun display tube itself and is, in fact, possible owing to the strip-like structure of the red, green and blue colour strips provided on the screen of such a one-gun display tube and luminescing when struck by the electron beam. Electrically the effect of these strips might be compared with that of pulses, since if the electron beam is beyond the strips (i.e. is located in the guard-bands not provided with phosphor material between the colour strips ) no light is produced so that the same result is attained as if a pulsatory signal switches the electron beam on and off. This strip-like structure produces, it is true, a line pattern in the reproduced image (either in horizontal direction in the Lawrence tube or in a vertical direction in the Apple tube), but this line structure is inherent in the one-gun tube and cannot be obviated by taking steps in the circuit arrangement. Moreover, this line structure is considerably less disturbing than the moiré effect, which would appear in the three-gun tubes if the aforesaid disturbing mixing products could penetrate to the three guns, since with the pulsatory, synchronous detection described above in the one-gun tubes black lines appear at the side of bright lines. It is known that due to the properties of the human eye the black lines fade away when the viewer is at a reasonable distance from the display screen. The moiré effect, however, is due to the sinusoidal signals which have to provide the synchronous demodulation in contrast to the performances in the one-gun tube. These sinusoidal signals change gradually from a high value to a low value so that an electron beam modulated by the disturbing mixing products will produce an image in which bright spots are periodically and gradually alternating with greyish to dark spots. Moreover, the line structure is constant and the moiré pattern is variable due to the fact that the brightness components in the disturbing mixing products are of a variable nature. A variable disturbance is considerably more troublesome than a constant disturbance, since it is observed much sooner by the viewer.

In conclusion it may therefore be stated that the French patent specification 1,313,438 describes a push-pull stage, but does not give the expert any indication for avoiding the moiré effect in a three-gun television tube, if no separate colour and brightness channels are employed.

Figure 2:
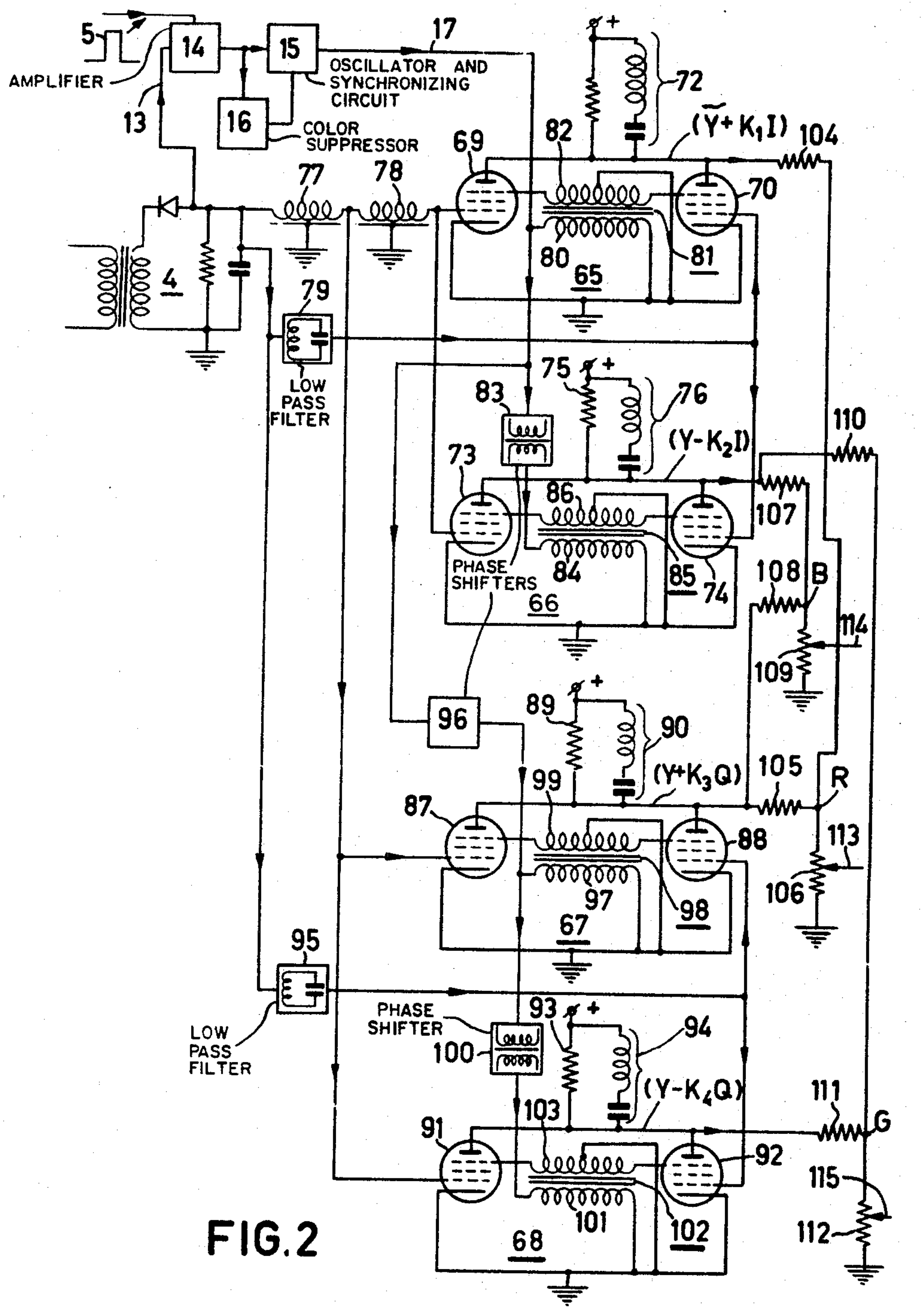

A few possible embodiments of circuit arrangements ccording to the invention will be described with reference ) the accompanying figures, of which FIG. 1 shows a first embodiment using three push-pull :ages, in which synchronous demodulation is performed 1 the so-called R-Y-, B-Y- and G-Y-directions and FIG. 2 shows a second embodiment employing four ush-pull stages in which synchronous demodulation is erformed in the so-called I- and Q-directions.

In the embodiment shown in FIG. 1 three push-pull :ages 1, 2 and 3 are employed in accordance with the ıvention. The input signals are directly obtained from the etector circuit 4. Each push-pull stage comprises two emodulators, formed in the push-pull stage 1 of FIG. 1 y the multigrid tubes 5 and 6, in the push-pull stage 2 by ıe multigrid tubes 7 and 8 and in the push-pull stage 3 y the multigrid tubes 9 and 10. The detected I.F. televi-ion signal detected in the detector circuit 4 is applied on he one hand through a delay circuit 11 to the first control-rids of the tubes 5, 7 and 9 and on the other hand through low bandpass filter 12 to the first control-grids of the ıbes 6, 8 and 10.

This once detected television signal, which also con-ains, as is known, the burst signal, is applied through the onductor 13 to an amplifier 14, to which are also applied ine fly-back pulses 15', which render this amplifier con-lucting only during the horizontal fly-back time. Thus the mplifier 14 serves for separating out the burst signal from he over-all once detected television signal, so that at the ıutput of the amplifier 14 the burst signal becomes avail-ble for synchronisation purposes at the member 15, which omprises the local oscillator for producing the subcarrier ignal and, moreover, synchronising members which syn-hronise the subcarrier signal produced by the local oscil-ator by means of the burst signal. The burst signal of the ıutput of the amplifier 14 is applied to a member 16, at the ıutput of which a voltage is produced, when the burst ignal is available. This output signal is then applied to he member 15 so that the local oscillator is operative vhen the burst signal is available, whereas it is not oper-ıtive in the absence of the burst signal. The production of uch a colour suppressing signal, by means of which the ocal oscillator can be stopped, is required for avoiding ınwanted colour effects on the screen of the display tube ıt the reception of a monochrome signal. The method of ›roducing a colour suppressing signal in such a case and he manner of stopping of the oscillator are described in he aforesaid American patent specification 2,744,155.

If it is assumed that in fact a colour television signal is eceived, the output 17 of the member 15 will have pro-luced at it a subcarrier signal of the waveform sin $\omega t$, vhich is applied in the first place to the primary winding [8 of the transformer 19, which is included in the push-›ull stage 1. The subcarrier signal thus applied is trans-:ormed by transformation to the secondary winding 20, he centre tapping of which is connected to earth through ı capacitor 21. Therefore, the subcarrier signal will be ıpplied to the control-grid 22 of the tube 5 in phase oppo-ition with respect to the subcarrier signal applied to the :ontrol-grid 23 of the tube 6. Said centre tapping is fur-:hermore connected to a variable tapping of the potenti-ɔmeter 24. Since the cathodes of the tubes 5 and 6 are at ı positive potential to earth by means of cathode resistors 25 and 26, the voltage at the control-grids 22 and 23 can ɔe adjusted relatively to the voltage at the cathodes of the :ubes 5 and 6 by the adjustment of the variable tapping of :he potentiometer 24. By means of this adjustment it is :herefore possible to obtain the saturation control for the ɔlue (B) colour signal, which can be derived, as will be ɔxplained more fully hereinafter, from the interconnected anodes of the tubes 5 and 6 and which can be directly applied to the Wehnelt cylinder 27 of the blue gun of the display tube 28. The interconnected anodes of the tubes 5 and 6 are connected through a resistor 29 to the supply voltage and the resistor 29 is shunted by a filter 30, which is tuned to the subcarrier frequency and which has such a bandwidth that this filter 30 suppresses subcarrier com-ponents still included in the output signal of the tubes 5 and 6.

The subcarrier signal obtained from the output 17 is supplied through the phase shifting network 31 also to the primary winding 32 of the transformer 33, which is in-cluded in the second push-pull stage 2. The phase-shifting network 31 produces a phase shift of 90° so that the trans-former 33 included in the second push-pull stage 2 receives a signal of the form: cos $\omega t$. This signal is transferred to the secondary winding 34, which is also provided with a centre tapping, which is connected through the capacitor 35 to earth. Therefore, the subcarrier signals will also be applied in phase opposition to the control-grids 36 and 37 of the tubes 7 and 8. Also this centre tapping is connected through a variable tapping to a potentiometer 38, by means of which the voltages at the control-grids 36 and 37 can be adjusted, the positive voltages on the cathodes of the tubes 7 and 8 being taken into consideration, which are provided with cathode resistors 39 and 40 so that the saturation control for the red (R) colour signal can be obtained, which red colour signal can be derived from the interconnected anodes of the tubes 7 and 8 and be ap-plied to the Wehnelt cylinder 41 of the red gun of the display tube 28.

The interconnected anodes of the tubes 7 and 8 are connected through a common anode resistor 42 to the supply voltage and also this resistor 42 is shunted by a filter 43, which serves for suppressing the residual sub-carrier components from the output signal of the push-pull stage 2.

Finally the subcarrier signal is applied through a fur-ther phase-shifting network 44 to the primary winding 45 of a transformer 46, included in the push-pull stage 3. The phase-shifting network 44 produces a phase-shift of an angle $\varphi$ with respect to the signal from the phase-shifting network 31, so that at the primary winding 45 there is operative a subcarrier signal of the waveform: cos $(\omega t+\varphi)$. This signal is transferred to the secondary winding 47 which is provided with a centre tapping which is connected by the capacitor 48 to earth. To the control-grids 49 and 50 of the tubes 9 and 10 there are there-fore applied again two subcarrier signals in phase opposi-tion, which have to perform the synchronous demodula-tion, so that green (G) colour signal appears at the inter-connected anodes of the tubes 9 and 10, which is applied to the Wehnelt cylinder 51 of the green gun of the display tube 28. Also the cathodes of the tubes 9 and 10 include cathode resistors 52 and 53 and the centre tapping of the secondary winding 47 is connected to a potentiometer 54 for the saturation control of the green colour signal. The interconnected anodes of the tubes 9 and 10 are connected through a common anode resistor 55 to the supply volt-age and also this resistor 55 is shunted by a filter 56, for removing the subcarrier signals from the output signal of the push-pull stage 3.

The circuit arrangement of FIG. 1 operates as follows.

The signal obtained from the detector circuit 4 does not loose any information in the delay circuit 11. There-fore, the signal at the control grids of the tubes 5, 7 and 9 will have the form given by the Equation 1:

$$V_{g1}=Y+\frac{R-Y}{1.14}\cos\omega t+\frac{B-Y}{2.03}\sin\omega t \quad (1)$$

This signal contains a brightness component Y, the red colour difference signal (R—Y) and the blue colour differ-ence signal (B—Y). From Equation 1 it is apparent that the red and blue colour difference signals are modulated in quadrature on a subcarrier of an angular frequency $\omega$. The subcarrier frequency in the American system is about 3.5 mc./s. and in the European system 4.5 mc./s.

The signal at the output of the delay circuit 11 may also be given by the Equation 2:

$$V_{g1}=Y+I\cos(\omega t+33°)+Q\sin(\omega t+33°) \quad (2)$$

and the sole difference consists in that the colour components I and Q are indicated, which components, as is known, are complex colour signals as used for example in the American N.T.S.C. (National Television System Committee). The signal I has a larger bandwidth (about 1.5 mc./s.) and is composed like a partial single-sideband signal, whereas the Q-signal has a bandwidth of about 0.5 mc./s. and is composed like a full double-sideband signal.

It is assumed that the anode current $i_{a1}$ of the tube 5 is given by Equation 3:

$$i_a = S_1V_{g1} + S_2V_{g2} + S_0V_{g1}V_{g2} \qquad (3)$$

wherein $S_1$ designates the conductance at the first control-grid, $S_2$ the conductance at the control-grid 22 and $S_0$ the conversion conductance of the tube 5. If the subcarrier signal applied to the control-grid 22 has the form indicated by Equation 4:

$$V_{g2} = A \sin \omega t \qquad (4)$$

the final anode current will have the form indicated by Equation 5:

$$i_{a1} = S_1Y + S_1\frac{R-Y}{1.14}\cos \omega t + S_1\frac{B-Y}{2.03}\sin \omega t + S_2A \sin \omega t + S_0YA \sin \omega t + \frac{S_0A(R-Y)}{1.14}\,\frac{\sin 2\omega t}{2} + \frac{S_0(B-Y)A}{2.03}\,\frac{1-\cos 2\omega^t}{2} \qquad (5)$$

Equation 5 includes the term: $S_0YA \sin \omega t$. This is the unwanted product term referred to in the premable, which term is the product of the brightness component and the subcarrier component.

This unwanted product term cannot be suppressed by means of filters, since the brightness component has a variable frequency, so that the unwanted product term also has a variable frequency.

This suppression can, however, be carried out by means of the second demodulator tube 6 included in the push-pull stage 1. Also the tube 6 has an anode current-grid voltage characteristic curve of the form:

$$i_{a2} = S_1V_{g1} + S_2V_{g2} + S_0V_{g1}V_{g2} \qquad (6)$$

The signal derived from the detector 4 is applied through the low bandpass filter 12 to the first control-grid of the tube 6. Since the filter 12 is proportioned so that it suppresses colour components from the once detected signal, the voltage at the first control-grid of the tube 6 will have the form indicated by the Equation 7:

$$V_{g1} = Y \qquad (7)$$

As stated above, the signal at the second control-grid 23 is in phase opposition to the signal at the control-grid 22 so that it has the form indicated by the Equation 8:

$$V_{g2} = -A \sin \omega t \qquad (8)$$

Inserting the signals indicated by the Equations 7 and 8 in the Equation 6, the final anode current has the form indicated by the Equation 9:

$$i_{a2} = S_1Y - S_2A \sin \omega t - S_0YA \sin \omega t \qquad (9)$$

Since the tubes 5 and 6 are provided with a common anode resistor 29, a voltage $V_{a1}$ will appear across said resistor, which is given by the Equation 10:

$$V_{a1} = (i_{a1} + i_{a2})R_{29} = \left[2S_1Y + S_1\frac{(R-Y)}{1.14}\cos \omega t + S_1\frac{(B-Y)}{2.03}\sin \omega t + S_0A\frac{(R-Y)}{1.14}\,\frac{\sin 2\omega t}{2} + S_0A\,\frac{(B-Y)}{2.3}\,\frac{1-\cos 2\omega t}{2}\right]R_{29} \qquad (10)$$

It will be seen that this output voltage $V_{a1}$ no longer includes the unwanted product term $S_0AY$ ($\sin \omega t$).

The filter 30, connected in parallel with the resistor 29, which filter must always be included in the output circuit of a synchronous demodulator, in order to suppress the subcarrier components, removes the terms of the angular frequencies $\omega$ and $2\omega$ from the output signal $V_{a1}$, so that finally this output signal is represented by:

$$V_{a1}\left[2S_1Y + S_0A\frac{(B-Y)}{4.06}\right]R_{29} = K.B \qquad (11)$$

This condition is satisfied if $$2S_1 = \frac{S_0A}{4.06} \text{ and } \frac{S_0A}{4.06}\cdot R_{29} = K$$

In the above equations $R_{29}$ is the value of the resistor 29 and K is the total amplification of the push-pull stage 1.

The second push-pull stage 2 with the tubes 7 and 8 produces the red (R) colour signal.

It will be seen from FIG. 1 that the signals applied to the first control-grids of the tubes 7 and 8 are the same as those for the push-pull stage 1, so that they are given by the Equations 1 and 7. The voltages at the second control-grids 36 and 37 are obtained from the subcarrier signal which is applied through the phase-shifting network 31. The voltage at the second control-grid 36 is given by the Equation 12:

$$V_{g2} = C \cos \omega t \qquad (12)$$

and that at the control-grid 37 by the Equation 13:

$$V_{g2} = -C \cos \omega t \qquad (13)$$

The required phase shift of 90° of the subcarrier signal applied to the control-grids 36 and 37 with respect to the subcarrier signal applied to the control-grids 22 and 23 is determined by the phase-shifting network 31, which must be a 90° phase-shifting network.

The difference between the amplitudes of the signals given the Equations 4 and 8 on the one hand and those given by the Equations 12 and 13 on the other hand can be readily obtained by means of the transformation ratios of the transformers 19 and 33. In principle, the signals at the primary windings 18 and 32 will have the same amplitude, but by a suitable choice of the number of turns of the windings 20 and 34 the desirable amplitudes A and C of the said subcarrier signals can be obtained.

Since also the tubes 7 and 8 have similar anode-current grid-voltage characteristic curves as the tubes 5 and 6, it can be proved in the manner used for the push-pull stage 1, that the output voltage $V_{a2}$ of the second push-pull stage 2 is given by the Equation 14:

$$V_{a2} = \left[2S_1'Y + S_o'A\frac{(R-Y)}{2.28}\right]R_{42} = K'R \qquad (14)$$

The condition of Equation 14 is satisfied, if:

$$2S_1' = \frac{S_0'C}{2.28} \text{ and } \frac{S_0'C}{2.28}\cdot R_{42} = K'$$

In these equations: $S'_1$, $S'_2$ and $S'_0$ are the conductances of the tubes 7 and 8, which are defined in the same manner as the conductances $S_1$, $S_2$ and $S_0$ of the tubes 5 and 6, whereas $R_{42}$ is the value of the anode resistor 42.

Finally in the push-pull stage 3 the green (G) colour signal is produced by applying to the two demodulator tubes 9 and 10 not only the signals given by the Equations 1 and 7, but also a signal to the control-grid 49, which has the form $V_{g2} = D \cos (\omega t + \varphi)$ and to the control-grid 50 a signal of the form $V_{g2} = -D \cos (\omega t + \varphi)$, wherein $\varphi = 146°$. The required phase shift of 146° relative to the signal applied to the control-grids 36 and 37 is obtained in the phase-shifting network 44.

Like in the foregoing description it can be calculated that the output voltage $V_{a3}$ of the push-pull stage 3 is given by the Equation 15:

$$V_{a3} = \left[2S''_1Y + S''_oD\frac{(G-Y)}{1.39}\right]R_{55} = K''G \qquad (15)$$

he condition of this equation is again satisfied, if $$2S''_1=\frac{S''_0D}{1.39} \text{ and } \frac{S''_0D.R}{1.39}=K''$$

ı these equations $S''_1$, $S''_2$ and $S''_0$ are the conductances f the tubes 9 and 10, which are defined in the same maner as the conductances $S_1$, $S_2$ and $S_0$ of the tubes 5 and while $R_{55}$ is the value of the anode resistor 55.

In the foregoing description various amplification facɔrs K, K' and K'' are used for the push-pull stages 1, 2 nd 3 respectively in order to provide the possibility of ɛadjusting differences in the red, blue and green guns. f these guns are identical and if the phosphors of the red, lue and green strips have the same efficiency, the amlification factors K, K' and K'' may be equal to each ther.

In the foregoing description it is furthermore assumed ıat the conversion conductance, determined by the conuctances $S_0$, $S'_0$ and $S''_0$, and by the amplitudes A, C and ), is such that in fact the desirable conversion amplificaions can be obtained. If this were not the case, the filters ıcluded in the cathode conductors of the tubes 5 to 10 ıay contribute to the demodulation process and hence aise the conversion amplification. These filters are esignated by 58, 59, 60, 61, 62, 63 respectively and are ıned to the subcarrier frequency and proportioned so hat their bandwidth is just sufficient to raise the converion amplification to the desired level.

It is furthermore possible to raise the conversion amılification in the following manner. The cathode resistors :5, 26, 39, 40, 52 and 53 are not decoupled and they are dapted so that just the desired conversion amplification s reached. The second control-grids 22, 23, 26, 37, 49 and ;0 are connected to earth through the capacitors 21, 35 ınd 48 respectively. The negative feedback production by aid cathode resistors is solely effective for the signal apılied to the first control-grids of the tubes 5 to 10. If no :ontrol-signal is applied to the first control-grid of a penode, the cathode current is substantially constant and the :ontrol-signal at the second control-grid will effect solely he distribution of said constant cathode current among he screen-grids and anode, held at a constant voltage, so hat for the alternating current no negative feedback ɔccurs, since for a constant cathode current the voltage lrop across the cathode resistor is also constant. If there s a signal operative at the control-grid of the pentode, he cathode current is varied, but it will be obvious that he negative feedback thus produced also for the earth:onnected second control-grid applies solely to the signal ɔperative across the first control-grid and hence affect the lirect amplification and will not affect the conversion ımplification.

In the preamble it is stated that the delay time of the lelay circuit 11 must be comparatively short. This may ɔe accounted for as follows. It will be obvious that the lelay time of the delay circuit 11 must be equal to the lelay time of the low bandpass filter 12. The low bandpass filter 12 has a bandwidth of about 3.5 mc./s. to about 4 mc./s. Since the delay time of a filter is inversely proportional to its bandwidth, it follows that the delay time of the low bandpass filter 12 is comparatively short, so that also the delay time of the delay circuit 11 is comparatively short. Comparing this with the delay time in receivers in which a separate brightness channel and a separate colour channel is employed, it will appear that, since the bandpass filter in such a colour channel must have a bandwidth of 1.5 to about 1 mc./s., the difference in bandwidths of the low bandpass filter 12 and a bandpass filter of such a colour channel is a factor 3.5 to 4. It follows therefrom that also the delay times of such filters differ by a factor of 3.5 to 4. It can thus be said that the delay time of the delay circuit 11 is about 3.5 to 4 times shorter than the delay time of a delay circuit of a separate brightness channel, as employed in the conventional colour receivers. This proves that the delay circuit 11 has a comparatively short delay time with respect to delay circuits in the brightness channels of conventional receivers.

In the foregoing specification it is stated that the delay time of a filter is inversely proportional to its bandwidth. This is not quite correct. This delay time is affected also by the flank steepness of the frequency characteristic curve of such a filter. If the flank steepness of the frequency characteristic curve of the low bandpass filter 12 is rendered greater at the cut-off frequency of 3.5 to 4 mc./s. (so that the selectivity is improved), the delay time of the filter 12 increases, so that also the delay time of the delay circuit 11 had to be raised. The latter may be avoided by connecting in series with the delay circuit 11 a second low bandpass filter, the cut-off frequency of which may be for example 5 mc./s., while its frequency characteristic curve has approximately the same flank steepness as the low bandpass filter 12 at 3.5 to 4 mc./s. The additional delay times of the two bandpass filters due to the increased flank steepnesses will then be approximately equal to each other, but the delay time which is inversely proportional to the bandwidth will be longer for the filter 12 than for the filter connected in series with the delay circuit 11. This delay circuit need therefore only obviate the difference in delays due to the difference in bandwidths. The filter of the cut-off frequency of about 5 mc./s. can then ensure that no sound signals arrive in the video channel, if sound signals are still included in the signal derived from the detector 4. The latter may be the case, for example, if also the intercarrier sound signals is derived from the detector 4.

A further advantage is that in the circuit arrangement according to the invention the demodulated colour signals are directly available and can be applied without the need for further steps to the Wehnelt cylinders 27, 41 and 51 or, if the phase is inverted, directly to the cathodes of said guns.

In the conventional receivers, however, the colour difference signals are applied to the Wehnelt cylinders and the brightness signals are applied to the cathodes of the three guns. This has the disadvantage that the control-conditions for the Wehnelt cylinders and the cathodes are considerably different, so that the signal is processed considerably less satisfactorily than in the case in which only one control-signal is applied to one control-electrode of a gun.

In the embodiment shown in FIG. 2 four push-pull stages 65, 66, 67 and 68 are used, which are constructed in a manner similar to the push-pull stages 1, 2 and 3 of FIG. 1. The difference consists in that with these push-pull stages the subcarrier signals applied to the second control-grids have such a phase that the push-pull stages 65 and 66 demodulate in the I-direction and the push-pull stages 67 and 68 in the Q-direction, the I- and Q-signals being the colour components determined by the Equation 2.

The push-pull stage 65 consists of two demodulator tubes 69 and 70. The anodes of said tubes are connected to each other and through a common output resistor 71 to the supply voltage. The resistor 71 is shunted by a filter 72, which again serves for filtering out the subcarrier components which are left after demodulation. Also the anodes of the tubes 73 and 74 of the push-pull stage 66 are interconnected and through a common anode resistor 75 they are connected to the supply voltage. Also the resistor 75 is shunted by a filter 76, for filtering out the subcarrier components. To the first control-grid of the tube 69 is applied the signal determined by the Equation 2 and derived from the detector 4 through two delay circuits 77 and 78, which have the same delay time as the low bandpass filter 79, through which the once detected colour television signal is applied to the first control-grid of the tube 70, which signal is therefore determined by Equation 7. From the output 17 the subcarrier signal of the form $$-\cos(\omega t+33°)$$

is applied to the primary winding 80 of the transformer 81, which is included in the push-pull stage 65. Like in the push-pull stages of FIG. 1 the centre tapping of the secondary winding 82 is connected to earth so that the subcarrier components at the second control-grids of the tubes 69 and 70 are in phase opposition.

The signal determined by the Equation 2 is applied not only to the first control-grid of the tube 69 but also to the first control-grid of the tube 73 and the signal determined by the Equation 7 is applied not only to the first control-grid of the tube 70 but also to the control-grid of the tube 74. Also the subcarrier signal derived from the output 17 is applied through the phase-shifting stage 83 (tube or transformer), which shifts the phase of the signal of the form $-\cos(\omega t+33°)$ through about 180°, applied to the primary winding 84 of the transformer 85. The secondary winding 86 of this transformer is connected to the second control-grids of the tubes 73 and 74, to which control-grids is applied the subcarrier signal in phase opposition with respect to the subcarrier signal applied to the corresponding second control-grids of the tubes 69 and 70. If there is no risk of cross-talk the secondary winding 86 may be directly coupled magnetically with the primary winding 80 of the transformer 81, in which case the phase-shifting stage 83 and the primary winding 84 plus the core of the transformer 85 are dispensed with. There should then be taken provisions that the sense of winding of the secondary winding 86 is opposite that of the winding 82.

Also the centre tapping of the secondary winding 86 must, of course, also be earthed so that the subcarrier signals of the second control-grids of the tubes 73 and 74 are relatively in phase opposition.

The two remaining push-pull stages 67 and 68 are constructed in the same manner as the push-pull stages 65 and 66. The push-pull stage 67 consists of two demodulator tubes 87 and 88, the anodes of which are connected to each other and through a common anode resistor 89 to the supply voltage. The resistor 89 is shunted by a filter 90 for suppressing the subcarrier components.

The push-pull stage 68 comprises two demodulator tubes 91 and 92. The anodes of these tubes are also connected to each other and through a common anode resistor 93 to the supply voltage. The resistor 93 is shunted by a filter 94 for suppressing the subcarrier components.

The signal derived from the detector 4 is applied solely through the delay circuit 77 to the first control-grid of the tube 87 of the third push-pull stage 67. This detector signal is also applied through the low bandpass filter 95 to the first control-grid of the tube 88 of the push-pull stage 67, so that a signal of the Equation 7 is operative at this first control-grid. The subcarrier signal of the output 17 is shifted in phase in the phase-shifting network 96 through 90° so that a signal of the form $-\sin(\omega t+33°)$ is operative at the primary winding 97 of the transformer 98 included in the push-pull stage 67. This signal is stepped up to the secondary winding 99, the centre tapping of which is connected to earth, so that the subcarrier signals are applied in phase opposition to the second control-grids of the tubes 87 and 88.

The signal applied to the first control-grid of the tube 87 is also applied to the first control-grid of the tube 91, whereas the signal applied to the first control-grid of the tube 88 is also operative at the first control-grid of the tube 92.

The signal derived from the phase-shifting network 96 is inverted in phase in the phase-inverting stage 100 and applied to the primary winding 101 of the transformer 102, included in the push-pull stage 68, the secondary winding 103, provided with a centre tapping, is connected to the second control-grids of the tubes 91 and 92. Also in this case, due to the phase-shift of 180° and to the inverting stage 100, the sub-carrier signal is operative at the second control-grids of the tubes 91 and 92 in phase opposition relative to that operative at the corresponding second control-grids of the tubes 87 and 88 and also here, if there is no risk of cross-talk, the phase inverting stage 100, the primary winding 101 and the core of the transformer 102 may be dispensed with, if the secondary winding 103 is magnetically coupled with the primary winding 97 and has a sense of winding unlike that of the winding 99.

It may be asked why in the embodiment of FIG. 2, in contrast to that of FIG. 1, two low bandpass filters 79 and 95 are employed instead of one. The reason is that the I-signal has a larger bandwidth than the Q-signal. Therefore, the low bandpass filter 79 must have a smaller bandwidth than the low bandpass filter 95. If the I-signal, as far as its single-sideband component is concerned, has for example a bandwidth of 1.5 mc./s and the frequency of the subcarrier signal is 4.5 mc./s., the bandwidth of the low bandpass filter 79 must be about 3 mc./s. The Q-signal, however, has a bandwidth of only 0.5 mc./s. so that the low bandpass filter 95 must have a bandwidth of 4 mc./s. As stated above, the delay time of a filter is in the first place inversely proportional to its bandwidth so that the delay time of the low bandpass filter 79 is longer than that of the low bandpass filter 95. Since there must not be a phase difference between the signals applied on the one hand to the first control-grids of the tubes 69 and 73 and on the other hand to the first control-grids of the tubes 70 and 74, the total delay time of the delay circuits 77 and 78 must be equal to the delay time of the low bandpass filter 79. In a similar manner it can be shown that the delay time of the delay circuit 77 must be equal to the delay time of the low bandpass filter 95 and since the delay time of the filter 95 is shorter than that of the filter 79, it is sufficient for applying the once detected signal to the first control-grids of the tubes 87 and 91 to use only the delay circuit 77.

Although in the embodiment of FIG. 2 the delay circuits 77 and 78 are combined for the application of the signal to the tubes 69 and 73, a delay circuit may be used for the application to the tubes 69 and 73, which has a delay time equal to that of the circuits 77 and 78, while for the application of the signal to the first control-grids of the tubes 87 and 91 use may be made of a separate delay circuit having a delay time equal to that of the circuit 77. This is more expensive, but under certain conditions, for example in view of cross-talk, it may be more desirable.

The phase of the subcarrier signal applied to the second control-grids of the tubes 69 and 70 is such that in the push-pull stage 65 demodulation is performed in the positive I-direction so that, since the Y-signal is not removed previously and will therefore appear due to the direct amplification also in the output signal the interconnected anodes of the tubes 69 and 70 receive a signal of the form $Y+K_1.I$, wherein $K_1$ is the total conversion amplification of the push-pull stage 65. The phase of the subcarrier signal applied to the second control-grids of the tubes 73 and 74 is unlike that of the signal at the second control-grids of the tubes 69 and 70 so that the second push-pull stage 66 demodulates in the negative I-direction. In the direct amplification of the brightness signal Y, applied to the first control-grids of the tubes 73 and 74 no variation will appear so that the output signal at the interconnected anodes of the tubes 73 and 74 has the form $Y-K_2.I$, wherein $K_2$ is the total conversion amplification of the push-pull stage 66.

The phase of the subcarrier signal applied to the second control-grids of the tubes 87 and 88 is such that the third push-pull stage 67 demodulates in the positive Q-direction. Therefore the interconnected anodes of the tubes 87 and 88 will receive a signal of the form $Y+K_3.Q$. The phase of the subcarrier signal applied to the second control-grids of the tubes 91 and 92 is such that the fourth push-pull stage 68 demodulates in the negative Q-direction, so that the interconnected anodes of the tubes 91 and 92 will receive a signal of the form $Y-K_4.Q$, wherein $K_3$ and $K_4$ ·e the conversion amplifications of the push-pull stages 7 and 68 respectively.

The output signals of the four push-pull stages 65, 66, 7 and 68 can be combined by means of a matrix network ) that the colour signals R, B and G can be directly ≥rived from said matrix network.

For this purpose the interconnected anodes of the tubes 9, 70 are connected through the resistors 104 and 105 ) the interconnected anodes of the tubes 87 and 88. The ınction of the resistors 104 and 105 is connected through comparatively large resistor 106 to earth. Across said ɜsistor 106 the red (R) colour sigal is produced. This an be accounted for in a simple manner.

The voltage across the resistor 106 is given, approxiıately by the Equation 16:

$$V_{106}=(Y+K_1I)R_{105}+(Y+K_3Q)R_{104}=K'R \quad (16)$$

'his equation can also be written:

$$Y(R_{104}+R_{105})+R_{105}K_1I+R_{104}K_3Q=K'R \quad (16')$$

.nd the output signal $V_{106}$ will be accurately equal to K'R, /herein K' is the amplification factor for the red signal R), if:

$$(R_{104}+R_{105})=K'$$

$$R_{105}K_1=0.96\ K'$$

.nd $$R_{104}K_3=0.62\ K'$$

'or the correctness of these numbers see Equation 15–8 ın page 397 of the book "Principles of Colour Television" ıf the Hazeltine Staff under the editorship of MacIlwain .nd Dean.

For producing the blue (B) colour signal the interconıected anodes of the tubes 73 and 74 are connected hrough the resistors 107 and 108 to the interconnected ınodes of the tubes 87 and 88. The junction of the resistors [07 and 108 is connected through a resistor 109 of com›aratively high value to earth. Also in this case it can be :asily proved that across the resistor 109 the blue colour ;ignal is produced, since for the voltage $V_{109}$ across the 'esistor 109 there can be written:

$$V_{109}=(Y-K_2I)R_{108}+(Y+K_3Q)R_{107}=KB \quad (17)$$

This equation may also be written as:

$$V_{109}=Y(R_{108}+R_{107})-K_2R_{108}I+K_3R_{107}Q=KB \quad (17')$$

ınd it will be obvious that the voltage $V_{109}$ is equal to K.*B*, wherein K is the amplification factor of the blue (B) colour signal, if $$R_{108}+R_{107}=K$$

$$K_2R_{108}=1.10\ K$$

ınd $$K_3R_{107}=1.70\ K$$

(For the correctness of these numbers see the Equation [5–9 on page 397 of the book "Principles of Colour Tele/ision.")

Finally for obtaining the green (G) colour signal the interconnected anodes of the tubes 73 and 74 are connected through the resistors 110 and 111 to the interconnected anodes of the tubes 91 and 92. The junction of the resistors 110 and 111 is connected by way of a comparatively heavy resistor 112 to earth. Also in this case it can be proved that the voltage $V_{112}$ across the resistor 112 is given by the Equation 18:

$$V_{112}=Y(R_{110}+R_{111})-K_2R_{110}I-K_4R_{111}Q=K''G \quad (18)$$

and the output voltage $V_{112}$ will be equal to *K''.G*, wherein K'' is the amplification factor for the green (G) colour signal if:

$$(R_{110}+R_{111})=K''$$

$$K_2R_{110}=0.27\ K''$$

and $$K_4R_{111}=0.65\ K''$$

(See for the correctness of the last numbers the Equation 15–10 on page 397 of the book "Principles of Colour Television".)

In order to control the saturation the resistors 106, 109 and 112 of the embodiment shown in FIG. 2 may be provided with variable tappings 113, 114 and 115 respectively, from which the signals for the Wehnelt cylinders of the red, blue and green guns can be derived.

Although in the embodiment of FIG. 2 four push-pull stages are employed, in principle three push-pull stages may suffice. It is found, when developing the values ensuing from the Equations 16', 17' and 18, the conversion amplification factors $K_1$ and $K_2$ may be rendered substantially equal to each other. Therefore, the push-pull stage 66 may be dispensed with and instead the screen grids of the tubes 69 and 70 can be interconnected and be connected through a common output resistor to the supply voltage. For the direct amplification the screen-grids then operate like the anodes of a triode, so that, when the screen-grid resistor is adapted, the brightness signal Y developed across said resistor may have substantially the same value and has the same phase as the brightness signal Y across the anode resistor 71.

As far as the conversion amplification is concerned, it it will be obvious that the demodulated I-signal is operative in phase opposition at the screen-grids as compared with the I-signal at the anode of the tube 69, since the subcarrier signal operative at the second control-grid feeds back the electrons not striking the anode of the screen-grids so that as far as the control of this second control-grid is concerned the anode voltages and the screen-grid voltages are in relative phase opposition. Since the distribution of the anode and screen-grid currents for direct and conversion amplifications does practically not exhibit any difference the I-signal developed across the anode resistor i.e. $K_1I$ will also attain practically the same value as the I-signal developed across the screen-grid resistor, i.e. $-K_2I$, if the screen-grid resistor is adapted so that the brightness signal Y across the anode resistor attains a value practically equal to that of the screen-grid resistor. This means that $K_1 \approx K_2$ so that also in this case four signals are available which can be processed in a similar manner in the matrix network of the resistors 104 to 112 to obtain the signals R, B and G as in the embodiment shown in FIG. 2.

Although in the foregoing description the demodulators of the push-pull stages are always formed by multigrid tubes, it will be obvious that this is not necessary, since the demodulator may be formed by any kind of element that exhibits mixing properties. The multigrid tubes may be replaced wholly or partly by triodes or by transistors, the sole difference being that we are concerned with additive mixing instead of being concerned with multiplicative mixing.

If the push-pull stage 66 of FIG. 2 is omitted, however, and if the interconnected screen-grids of the tubes 69 and 70 are used, at the tide of the interconnected anodes of the tubes, and operate as output electrodes, the tubes 69 and 70 must be multigrid tubes.

What is claimed is:

1. A colour television receiver for producing three colour signals, said receiver being of the type comprising a local oscillator for producing a subcarrier signal which is synchronized by means of an incoming burst signal, three demodulator stages, and means applying a color television signal to said three stages, said color television signal consisting of a brightness component Y and two colour components modulated quadrature on a subcarrier signal; characterized in that each said stage is a push-pull stage comprising two demodulators, a delay circuit having a comparatively short delay time connected to apply said colour television signal to one of said demodulators, means applying a subcarrier signal from said local oscillator to said one demodulator for the synchronous demodulation of the color components, a low bandpass filter having a delay time equal to that of the delay circuit and which passes solely the brightness signal, means applying said color television signal to the other demodulator of said stage by way of said filter, means applying a subcarrier signal from the local oscillator to said other demodulator whereby one of said color television signal and subcarrier signal as applied to said other demodulator is in phase opposition with respect to the corresponding signal as applied to said one demodulator, and output circuit means interconnecting the output circuits of said two demodulators and comprising filter means for suppressing subcarrier components.

2. A receiver as claimed in claim 1, for processing a colour television signal which contains the red (R-Y), the blue (B-Y) and the green (G-Y) colour difference signals, comprising means for applying the subcarrier signal applied in phase opposition to the two demodulators of the first push-pull stage with such a phase that demodulation is performed in the direction of the blue (B-Y) colour difference signal so that the blue (B) colour signal can be obtained directly from the interconnected output circuits of the first push-pull stage, means for applying the subcarrier signal in phase opposition to the two demodulators of the second push-pull stage with such a phase that demodulation is performed in the direction of the red (R-Y) colour difference signal so that the red (R) colour signal can be obtained directly from the interconnected output circuits of this second stage, and means for applying the subcarrier signal to the two demodulators of the third push-pull stage with such a phase that demodulation is performed in the direction of the green (G-Y) colour difference signal and the green (G) signal can be directly obtained from the third push-pull stage.

3. A receiver as claimed in claim 1, for processing colour components composed of an I- and a Q-component, which are modulated in quadrature on the subcarrier signal, comprising means for applying the subcarrier signals in phase opposition to the demodulators of at least one push-pull stage, a supply voltage source, impedance means for each stage, means for connecting the output electrodes of each pair of demodulators of said push-pull stages to each other and through the respective said impedance to said supply voltage source, the applied subcarrier signals having such phases that four output signals i.e. $Y+K_1I$, $Y-K_2I$, $Y+K_3Q$ and $Y-K_4Q$, are produced, wherein Y is the brightness signal and $K_1$, $K_2$, $K_3$ and $K_4$ are conversion amplification constants, and matrix network means for combining said four output signals to obtain the three colour signals R, G and B.

4. A receiver as claimed in claim 3 for processing a colour television signal in which the two colour components (I and Q) have different bandwidths, comprising a first low bandpass filter having a bandwidth equal to the total bandwidth of a brightness signal Y minus the bandwidth of the colour component I of the largest bandwidth for applying said television signals to one demodulator of at least one stage a delay circuit having a delay time equal to that of the first low bandpass filter for applying said television signals to the other demodulator associated with said at least one stage for demodulating in the I-direction, a second low bandpass filter having a bandwidth equal to the total bandwidth of the brightness signal Y minus the bandwidth of the colour component Q of the smallest bandwidth for applying said colour television signal to one, demodulator of at least another stage, and a delay circuit having a delay time equal to that of the second low bandpass filter for applying said television signal to the other demodulator associated with said other stage for demodulating in the Q-direction.

5. A receiver as claimed in claim 4, wherein the two delay circuits are combined to form a single delay circuit, comprising means for applying said colour television signal to the input of said single delay circuit, means connecting the output of said single delay circuit to the other demodulator of the I-push-pull stages, and means connecting a tapping of said delay circuit to the other demodulator of the Q-push-pull stages.

References Cited

UNITED STATES PATENTS

| | | | |
|---|---|---|---|
| 2,744,155 | 5/1956 | Kihn | 178—5.4 |
| 2,908,751 | 10/1959 | Lockhart | 178—5.4 |
| 3,238,292 | 3/1966 | Van Odenhoven et al. | 178—5.4 |

JOHN W. CALDWELL, *Acting Primary Examiner.*

J. A. O'BRIEN, *Assistant Examiner.*